United States Patent
Cai et al.

(10) Patent No.: US 8,711,739 B1
(45) Date of Patent: *Apr. 29, 2014

(54) SUBCARRIER CLUSTER-BASED POWER CONTROL IN WIRELESS COMMUNICATIONS

(75) Inventors: Sean Cai, San Diego, CA (US); Jason Hou, Carlsbad, CA (US); Jing Wang, San Diego, CA (US); Dazi Feng, San Diego, CA (US); Mary Chion, Belle Mead, NJ (US); Jun Han, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/253,048

(22) Filed: Oct. 4, 2011

Related U.S. Application Data (63) Continuation of application No. 11/184,039, filed on Oct. 20, 2005, now Pat. No. 8,031,642.

(60) Provisional application No. 60/620,791, filed on Oct. 20, 2004.

(51) Int. Cl.
*H04B 7/005* (2006.01)
*H04B 7/06* (2006.01)

(52) U.S. Cl.
CPC .............. *H04B 7/005* (2013.01); *H04B 7/0619* (2013.01)
USPC ........................................... 370/278; 455/69

(58) Field of Classification Search
CPC ...................................................... H04B 7/005
USPC ..................................... 370/278, 208; 455/69
See application file for complete search history.

(56) References Cited

U.S. PATENT DOCUMENTS

| | | | | |
|---|---|---|---|---|
| 5,722,051 | A | * | 2/1998 | Agrawal et al. ................. 455/69 |
| 6,775,480 | B1 | * | 8/2004 | Goodwill ...................... 398/158 |
| 6,888,887 | B1 | * | 5/2005 | Shattil ........................... 375/239 |
| 7,672,674 | B2 | * | 3/2010 | Mahany et al. ............ 455/452.2 |
| 2003/0086366 | A1 | | 5/2003 | Branlund et al. |
| 2003/0125040 | A1 | | 7/2003 | Walton et al. |
| 2004/0120274 | A1 | * | 6/2004 | Petre et al. .................... 370/320 |
| 2004/0252632 | A1 | * | 12/2004 | Bourdoux et al. ............ 370/210 |
| 2005/0043052 | A1 | * | 2/2005 | Whinnett et al. ............. 455/522 |
| 2005/0053036 | A1 | | 3/2005 | Takeda |
| 2005/0105589 | A1 | | 5/2005 | Sung et al. |

OTHER PUBLICATIONS

Cosovic, I., "OFDMA Code-Division Multiplexing with Pre-Equalization for Mobile Communications," Telecommunications Forum (TELFOR'03), Belgrade, Serbia and Montenegro, Nov. 25-27, 2003, 4 pages.

Alamouti, S.M., "A Simple Transmit Diversity Technique for Wireless Communications," IEEE Journal on Select Areas in Communications, 16(8):1451-1458, Oct. 1998.

* cited by examiner

*Primary Examiner* — Wei Zhao
(74) *Attorney, Agent, or Firm* — Perkins Coie LLP (57) ABSTRACT

Devices, systems and techniques to monitor signal fading based on a cluster of subcarriers at a receiver and feedback monitored signal fading to a transmitter in wireless communication systems such as OFDM and OFDMA systems.

19 Claims, 5 Drawing Sheets

SUBCARRIER CLUSTER-BASED POWER CONTROL IN WIRELESS COMMUNICATIONS

CROSS REFERENCE TO RELATED APPLICATION

This patent application is a continuation of U.S. patent application Ser. No. 11/184,039, filed Oct. 20, 2005, which claims the benefit of U.S. Provisional Application No. 60/620,791, filed Oct. 20, 2004. The entire content of the before-mentioned patent application is incorporated by reference as part of the disclosure of this application.

BACKGROUND

This application relates to wireless communication systems and techniques.

Wireless communication systems use electromagnetic waves to communicate with wireless communication devices located within cells of coverage areas of the systems. A radio spectral range or band designated or allocated for a wireless communication service or a particular class of wireless services may be divided into different radio carrier frequencies for generating different communication frequency channels. The existing and developing specifications under IEEE 802.16x standards support wireless communications based on Orthogonal Frequency Division Multiplexing (OFDM) and orthogonal frequency division multiple access (OFDMA) are IEEE P802.16-REVd/D5-2004 and IEEE P802.16e/D5-2004.

Figure 1:
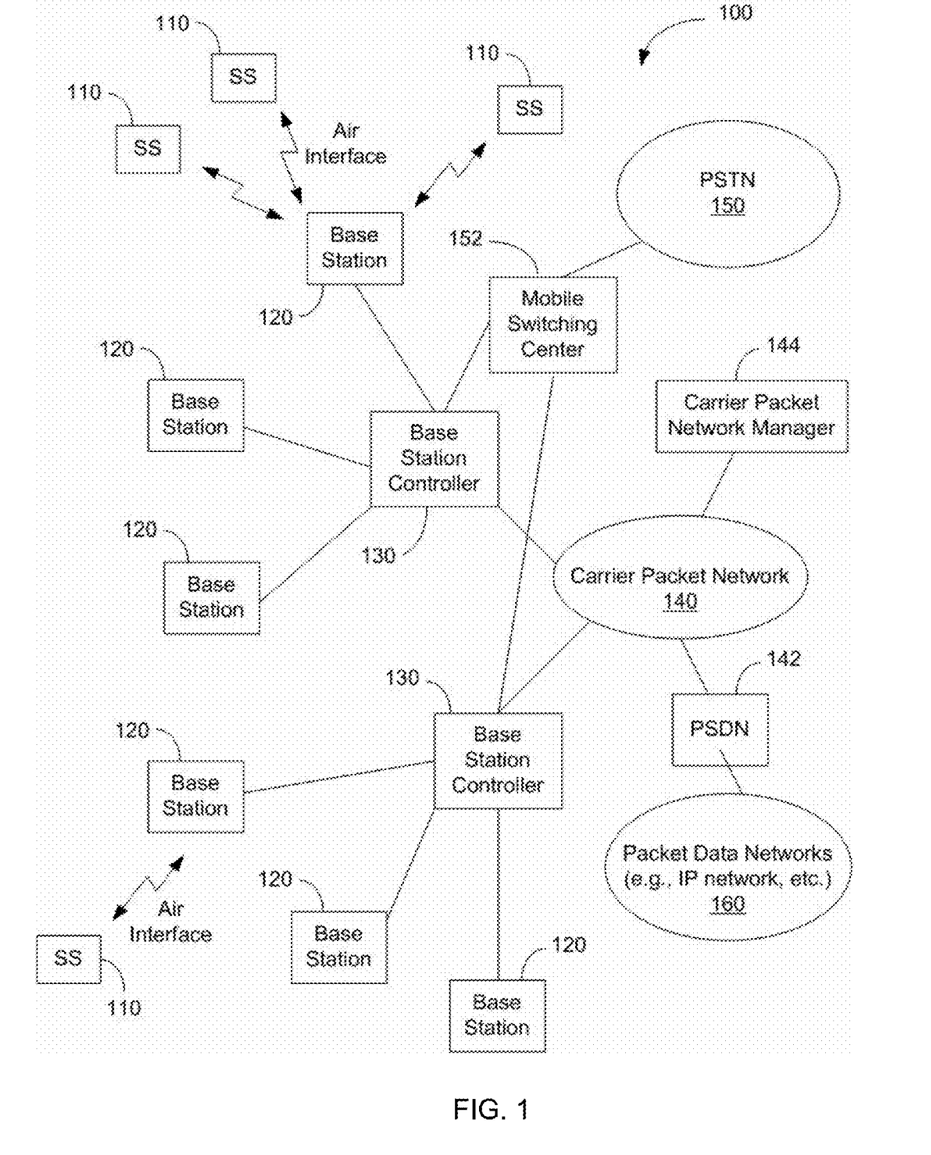
FIG. 1 shows an exemplary OFDM/OFDMA wireless communication system.

FIG. 1 shows an exemplary wireless communication system 100 that uses communication channels at different frequencies under OFDM or OFDMA to provide wireless communication services and to implement the techniques described in this application. The system 100 may include a network of base stations (BSs) or base station transceivers 120 that are spatially distributed in a service area to form a radio access network for wireless subscriber or subscriber stations (SSs) 110. In some implementations, a base station 120 may be designed to have directional antennas and to produce two or more directional beams to further divide each cell into different sections. Base station controllers (BSCs) 130 are connected, usually with wires or cables, to BSs 120 and control the connected BSs 120. Each BSC 130 is usually connected to and controls two or more designated BSs 120.

The wireless system 100 may include a carrier packet network 140 that may be connected to one or more public switched telephone networks (PSTN) 150 and one or more packet data networks 160 (e.g., an IP network). A mobile switching center (MSC) 152 may be used as an interface between the BSCs 130 and the PSTN 101. A packet data serving node 142 may be used to provide an interface between the carrier packet network 140 and the packet data network 160. In addition, a carrier packet network manager 144 may be connected to the carrier packet network 140 to provide various network management functions, such as such as an AAA server for authentication, authorization, and accounting (AAA) functions.

Each subscriber station 110 may be a stationary or mobile wireless communication device. Examples of a stationary wireless device may include desktop computers and computer servers. Examples of a mobile wireless device may include mobile wireless phones, Personal Digital Assistants (PDAs), and mobile computers. A subscriber station 110 may be any communication device capable of wirelessly communicating with base stations 120.

In OFDM and OFDMA systems, it is desirable to control the transmitting power levels at different frequencies in order to achieve desired system operations, e.g., maintaining a certain level of the system performance and the quality of service.

SUMMARY

This application describes devices, systems and techniques to monitor signal fading at a receiver and feedback monitored signal fading to a transmitter in wireless communication systems such as OFDM and OFDMA systems.

In one implementation, a method is described to control the power in a wireless communication system based on OFDM or OFDMA. A cluster signal parameter of each of a plurality of clusters of sub-carriers at a receiver is monitored. Each cluster comprises a set of sub-carriers that are sequential in frequency and the cluster signal parameter indicates signal fading of the cluster as a whole. The information of the cluster signal parameter of a selected cluster as a whole, without signal fading information of each individual subcarrier in each cluster, is fed back to a transmitter that produces and transmits the sub-carriers received by the receiver. The transmitter is controlled in response to the cluster signal parameter to selectively increase transmit power of at least one cluster when the cluster signal parameter of the one cluster is below a threshold.

In other implementations, the transmit power is adjusted or allocated to compensate the channel fading on one or more clusters whose received signal-to-noise ratios are below a threshold, meanwhile for clusters whose received signal-to-noise rations are above the threshold, the transmit power in each of such clusters is decayed by time without explicit signal-to-noise ratios feedback or power control command from the mobile station. For MIMO, power weighting on the transmitter side is done to inverse the channel fading.

These and other implementations and variations are described in greater detail in the attached drawings, the detailed description and claims.

DETAILED DESCRIPTION

Radio transceivers used in wireless communications, including the base stations and subscriber stations, may use a single antenna or multiple antennas to transmit signals and a single antenna or multiple antennas to receive signals. FIG. 1 shows one example of wireless communication systems. A transmitter in the following description may be either a transmitting base station or subscriber station and a receiver in the following description may be either a receiving base station or subscriber station. The wireless communication systems that implement the cluster-based power control techniques described here may be configured to operate in the communication frequency bands from 2 to 11 GHz under OFDM and OFDMA provided in IEEE 802.16 standards. In OFDM and OFDMA systems, the available frequency band is divided into subcarriers at different frequencies that are orthogonal. In an OFDMA system, a subchannel is formed from a subset of subcarriers. In OFDMA, a total of 32 sub channels are allocated to each radio cell. When two or more transmitter antennas are used in a transmitter, a transmit diversity may be achieved based on the space-time coding (STC) to improve the signal reception performance. Radio transceivers with multiple input and multiple output (MIMO) antennas may use the space-time coding to achieve significant performance improvement in a wireless channel environment where multipath effects can significantly degrade the signal reception.

The techniques described in this application may be used to improve the performance in STC configurations and non-STC configurations in OFDM and OFDMA systems. The transmit antenna power can be redistributed across sub-carriers, such that the power levels of subcarriers of low signal-to-noise ratios (SNRs) can be selectively boosted and consequently to increase their SNRs and the associated bit error rates (BERs) to predetermined acceptable levels. In one implementation, for example, while boosting the power of low SNR sub-carriers, the power of high SNR sub-carriers is reduced accordingly so that the total power in all subcarriers remains the same.

One aspect of the present cluster-based power control for wireless communication systems based on OFDM or OFDMA is to divide all sub-carriers or sub-carrier channels into multiple clusters of sub-carriers and to monitor a power parameter representing each cluster for the power control at the transmitter side. Each cluster includes a set of sub-carriers that are sequential in frequency. Each cluster is monitored at the receiver side as a whole. As such, this cluster-based power control avoids monitoring and reporting the power level at the receiver side for each individual sub-carrier and hence reduces the amount of information that is fed back from the receiver side to the transmitter side. The bandwidth for the feedback channel, therefore, is significantly reduced in comparison to a situation where the power level of each sub-carrier is monitored and the power monitor information for each sub-carrier is fed back to the transmitter side. The information of the signal fading for one or more clusters is fed back to the transmitter side that produces and transmits the sub-carriers. In response to the feedback information at the cluster level, one or more transmitters at the transmitter side are controlled to adjust the transmit power levels of the sub-carriers in a cluster whose signal fading reaches a pre-defined threshold level. In this design, the transmit power of one or more selected clusters can be increased. For example, if two clusters are measured at a receiver to be below the pre-defined threshold receiver power level, the two clusters will be increased in their transmit power levels at the transmitter side. In some implementations, the total transmit power of all subcarriers may be kept at a constant where the increase in transmit power for one or more degraded clusters is accompanied by a decrease in transmit power for one or more other clusters.

Other features may be implemented with the above cluster-based power control. For example, to further reduce the amount of the power control data or information that is fed back to the transmitter side, the feedback information, e.g., a request for boosting transmit power of a cluster with significant signal fading, may be sent from the receiver side to the transmitter side only when a cluster's power level, e.g., the averaged power of all sub-carriers in a cluster, or the averaged signal-to-noise ratio of all sub-carriers in a cluster, falls below the pre-defined threshold and thus requires power boosting at the transmitter side. For example, if the received power levels of all clusters at the receiver side are above the threshold, no feedback communication to the transmitter side is made from the receiver side. The transmitter side operates according to its last-set power levels for the different clusters. When a cluster falls below the threshold, the receiver side measures the amount of signal degradation and computes the desired power boosting level at the transmitter side. Next, the receiver side sends a feedback signal to the transmitter side to request for a specified amount of power boosting for that degraded cluster only. Feedback may be made for two or more clusters that operate below the threshold.

The conditions for transmission in wireless communications may change over time. Such changes may be caused by, e.g., the movement of a mobile subscriber station or changes in the weather conditions along the signal path(s) between the transmitter and the receiver. Hence, a transmit power set for a cluster at a particular time may be too high at a later time and a lower transmit power for that cluster is sufficient to maintain the received power at the receiver side above the threshold. In order to save the transmit power, the transmit power for each sub-carrier may be set to decrease with time in a predetermined manner. Hence, if no feedback for power boosting for a particular cluster is received at the transmitter side, the transmit power for each sub-carrier in that cluster reduces over time until a power boosting feedback is received for that cluster. Upon receiving the feedback, the power of the cluster is boosted to a higher level at the transmitter side and, once gain, decreases over time from that higher level. The time decay of the transmit power may be set at a suitable manner, such as the inverse of time ($1/t$) or $1/t^2$. Notably, this default time decay at the transmitter side does not require the receiver side to send any feedback to the transmitter side and thus further reduces the feedback bandwidth. In implementing this decay mechanism, the decay rates for different receivers may be different. This is in part because different receivers operate under different conditions that affect the signal quality of the received sub-carriers.

Implementations of the present power control may be used to achieve certain operating advantages. For example, the present power control may be used to achieve at least one of the following features: a low feedback bandwidth requirement, a low transmit power, and a low computational complexity. The power control may be used in both non-STC transmitters and receivers, and STC-based MIMO transmitters and receivers.

A. Single Transmit Antenna

Figure 2A:
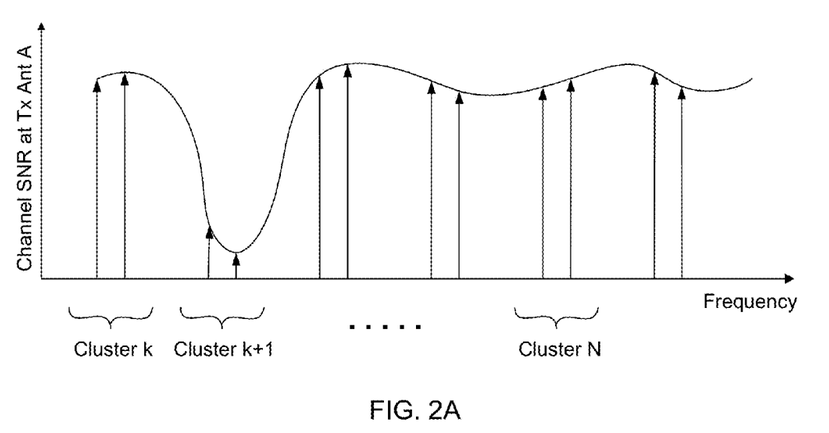
FIGS. 2A, 2B and 2C show examples of signal fading in different clusters of subcarriers.

When a single transmit antenna is used, multiple scattering may cause subcarriers within the channel bandwidth to experience frequency selective fading. FIG. 2A shows a snapshot of the signal amplitudes of the received signal from Tx (transmit) antenna A in one example, where the channel SNR distribution across a section of multiple clusters is shown. Each cluster has n consecutive sub-carriers. In the illustrated example, the received channel quality (e.g. SNR) of cluster (k+1) is much lower than other clusters due to the multi-path fading. The channel quality conditions can be measured by the receiver and the measured results can be fed back to the transmitter for adjusting the transmit powers of the sub-carriers.

The information that cluster (k+1) is significantly faded may be obtained by various techniques, e.g., using the channel quality indication (CQI) measurement. The measured average SNR over a cluster may be obtained and then compared to a predetermined threshold by the receiver in order to determine the degree of fading for the cluster and the CQI for purpose of channel reporting. To reduce the overhead of such channel reporting, only the clusters with averaged SNR below the pre-defined threshold at the receiver are notified to the transmitter for pre-coding process to simplify the power control.

In some implementations, two thresholds at a receiver may be used. The first threshold represents a pre-defined lower limit of the signal parameter below which the received signal at the receiver is not acceptable, e.g., the minimum signal-to-noise threshold or the minimum received signal power. The second threshold represents a pre-defined upper limit of the received signal parameter, such as the maximum signal-to-noise threshold or the maximum received signal power, where when the received signal exceeds the upper threshold, the transmit power at the transmitter side is too high and is beyond what is needed for acceptable system performance. The transmit power for each cluster that reaches above the upper threshold can be reduced. In addition, the power reduced from the cluster whose signal parameter is above the upper threshold can be allocated to increase the transmit power of a cluster whose signal parameter is below the lower threshold. Hence, in such implementations, the monitoring mechanism is to monitor the received signal parameter and raises a flag when the either of the two thresholds is reached. When either of the two thresholds is reached, the information on a cluster that which reaches the threshold is fed back to the transmitter side and the transmitter power is adjusted. No feedback is sent from the receiver to the transmitter when the received signal operates between the two thresholds.

If the system includes multiple Rx (receive) antennas, the combined CQI measurement for the Rx antennas can be made after the MRC (maximum ratio combining) operation at the receiver. The combined CQI measurement can then be fed back to the transmit antenna for the power control. One or more clusters whose cluster SNRs are degraded below the threshold are boosted in their transmit power.

B. Multiple Transmit Antennas

Figure 2B:
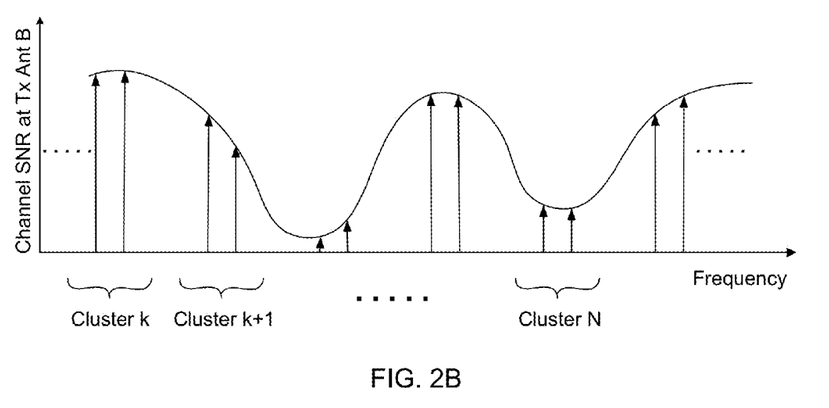
Figure 2C:
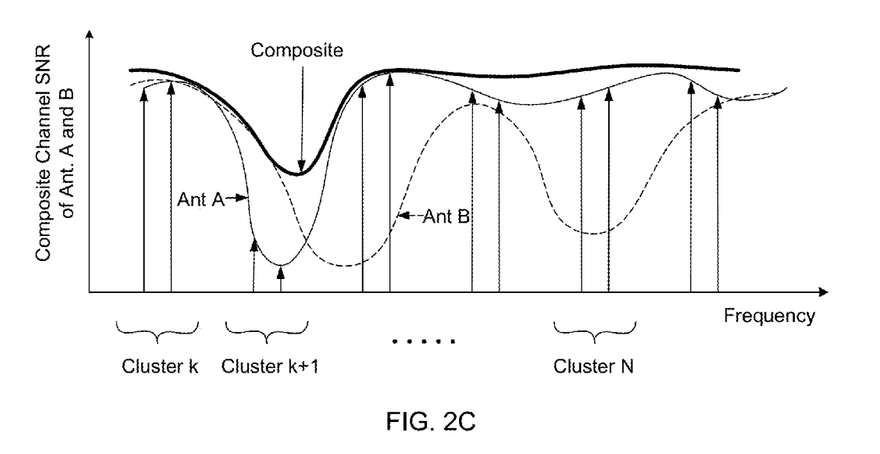

An STC MIMO system may have at least two transmit antennas A and B to achieve desired transmit diversity. FIG. 2B shows an exemplary snapshot taken from Tx antenna B for the channel profile. In this example, the clusters of the received subcarriers at the receiver have different degrees of signal fading. More specifically, the signal fading in the cluster (k+1) is less than the signal fading in the cluster N. FIG. 2C shows the composite channel quality of the exemplary STC system where the received composite SNR for the cluster (k+1) of Tx antennas A and B is much lower than the composite SNRs for other clusters.

The information that cluster (k+1) is deeply faded may be obtained from the channel quality indication (CQI) measurement for each Tx antenna. For example, the signal fading for a cluster can be determined by comparing the average SNR of measured SNRs of all subcarriers within the cluster to a predetermined threshold average SNR. To reduce the overhead of such channel reporting, only the clusters with averaged SNR below the lower threshold or above the upper threshold are notified to the transmitter for pre-coding process or simply power control. For N Tx antennas where N is an integer number greater than two, the composite averaged SNR over the N antennas is measured, and one CQI channel is used for each transmit antenna.

Once the composite CQI measurement for N Tx antennas is performed, the result is fed back to the transmitter via a CQI channel. The feedback includes two parameters, the physical cluster number with an inadequate SNR below the lower threshold or with an excessive SNR above the upper threshold, and a corresponding relative nominal SNR level in dB for that cluster.

If the system uses multiple Rx antennas at a receiver for receiving signals, the composite CQI measurement can be made after the MRC (maximum ratio combining) operation at the receiver following the space-time decoding process. The composite CQI measurement can be fed back to each transmit antenna.

In an STC system, an MIMO transmission zone within a transmission signal may include one or multiple MIMO preamble symbols, in which the transmission power of preamble tones can be adjusted on per cluster and per antenna base according to the composite feedback results from served receivers. Similarly, a MIMO transmission zone with multiple MIMO pilot tones may be inserted in data regions, in which the transmission power of pilot tones can be adjusted together with related data tones on per cluster and per antenna base according to the composite feedback results from served receivers. The STC output of each cluster can be weighted by a STC weight matrix (W) before mapping onto transmit antennas. An example of the STC weight matrix (W) is given below for an example with 4 actual antennas and 3 space-time coding codes applied to the antennas for a cluster of subcarriers:

$$W = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix}$$

In another example for 4 actual antennas and a full rate coding, the corresponding MIMO weight matrix is:

$$W = \begin{bmatrix} w_1 \\ w_2 \\ w_3 \\ w_4 \end{bmatrix}$$

Figure 3A:
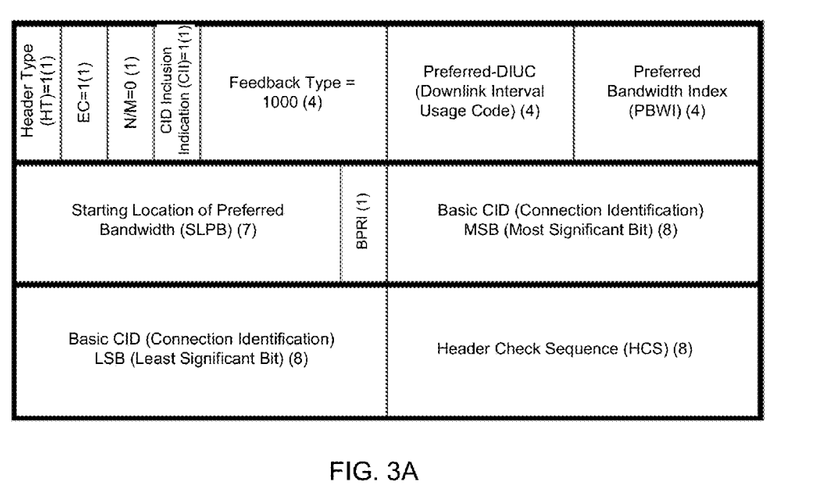
FIGS. 3A and 3B show examples of MIMO Channel Feedback header with and without CID field.
Figure 3B:
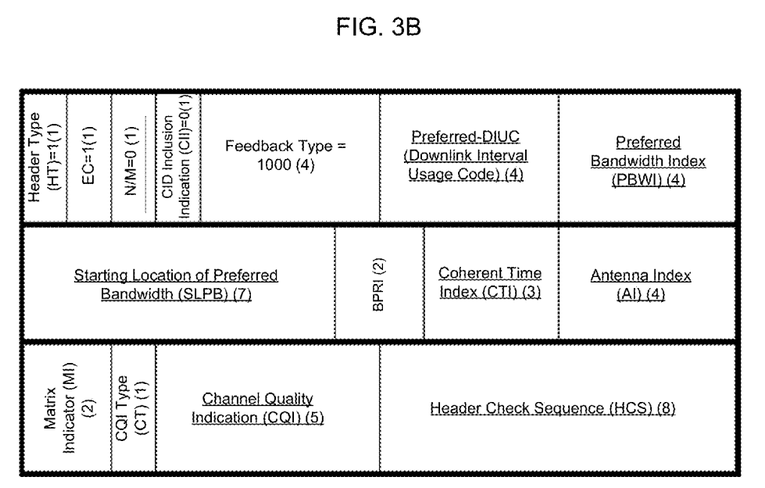

The MIMO weight matrix can be included in the feedback and can be sent back to the transmitter via a MIMO Channel Feedback header with CID (Connection Identification) field as shown in FIG. 3A or without CID field as shown in FIG. 3B. The MIMO Channel Feedback header shall have the following properties: a) The length of the header shall always be 6 bytes; b) The TYPE field shall be "1000"; c) PREFERRED-DIUC (Downlink Interval Usage Code) indicates the preferred DIUC suggested by the MSS; d) PBWI provides the size of the preferred bandwidth which can be used for DIUC transmission; e) SLPB (Starting Location of Preferred Bandwidth) points to the starting preferred bandwidth location. Combining with PBWI field, the transmitting base station knows the exact size and location of the preferred bandwidth in the channel; f) BPRI can be used to rank up to 4 preferred burst profiles within the DL channel; g) CTI provides coherent time information; h) AI can support up to 4 antennas; i) MI suggests the preferred STC/MIMO Matrix for the MSS; j) CT/CQI can support two types of CQI report. The detailed example of a MIMO Channel Feedback header is shown in the Table below.

TABLE

| Name | Length (bits) | Description |
|---|---|---|
| HT | 1 | Header Type = "1" |
| EC | 1 | Always set to "1" |
| N/M | 1 | Always set to "0" |
| CII | 1 | The CII field (Full CID Inclusion Indication) shall be set to 1 for the full CID field and set to 0 for the header with truncated CID field. |
| Feedback Type | 4 | Type = "1000" |
| Preferred DIUC | 4 | Index of the DIUC preferred by the MSS |
| PBWI | 4 | Preferred Bandwidth Index indicates the ratio of the preferred bandwidth over used channel bandwidth (excluding guard bands):<br>0000: 1<br>0001: 3/4<br>0010: 2/3<br>0011: 1/2<br>0100: 1/3<br>0101: 1/4<br>0110: 1/5<br>0111: 1/6<br>1000: 1/8<br>1001: 1/10<br>1010: 1/12<br>1011: 1/16<br>1100: 1/24<br>1101: 1/32<br>1110: 1/48<br>1111: 1/64 |
| SLPB | 7 | Starting Location of Preferred Bandwidth: 0-127<br>The effective bandwidth (used bandwidth) is divided into 1/128 interval, from 0 to 127 representing from lower to higher band. SLPB indicates the starting location of preferred bandwidth for the DIUC burst profile. |
| BPRI | 1 or 2 | Burst Profile Ranking Indicator (without basic CID):<br>(Or, Channel Condition Ranking Indicator) BPRI indicates the ranking for DL channel condition of the preferred bandwidth as reported in the current header where 0 is the most preferred bandwidth):<br>00: 1st preferred burst profile<br>10: 2nd preferred burst profile<br>01: 3rd preferred burst profile<br>11: 4th preferred burst profile<br>Burst Profile Ranking Indicator (including basic CID):<br>0: 1st preferred burst profile<br>1: 2nd preferred burst profile |
| CTI | 3 | Coherent Time Index: CTI indicates the proximate duration of the valid MIMO channel conditions:<br>000: Infinite<br>001: 1 frame<br>010: 2 frames<br>011: 3 frames<br>100: 4 frames<br>101: 8 frames<br>110: 14 frames<br>111: 24 frames |
| AI | 4 | This report can be a composite channel condition report, each bit represents for each antenna; "1" is applicable, "0" is not applicable<br>Antenna Index:<br>Bit 0 (MSB) - Antenna 0<br>Bit 1 - Antenna 1<br>Bit 2 - Antenna 2<br>Bit 3 (LSB) - Antenna 3 |
| MI | 2 | Matrix Indicator:<br>00: No STC<br>01: Matrix A<br>10: Matrix B<br>11: Matrix C |
| CT | 1 | CQI Type: The type of CQI feedback in the CQI field:<br>0: DL average CQI feedback<br>1: CQI feedback for the preferred bandwidth indicated in the current header |
| CQI | 5 | CQI feedback |
| CID | 16 | MSS basic CID |
| HCS | 8 | Header Check Sequence (same usage as HCS entry in Table 5). |

Figure 4:
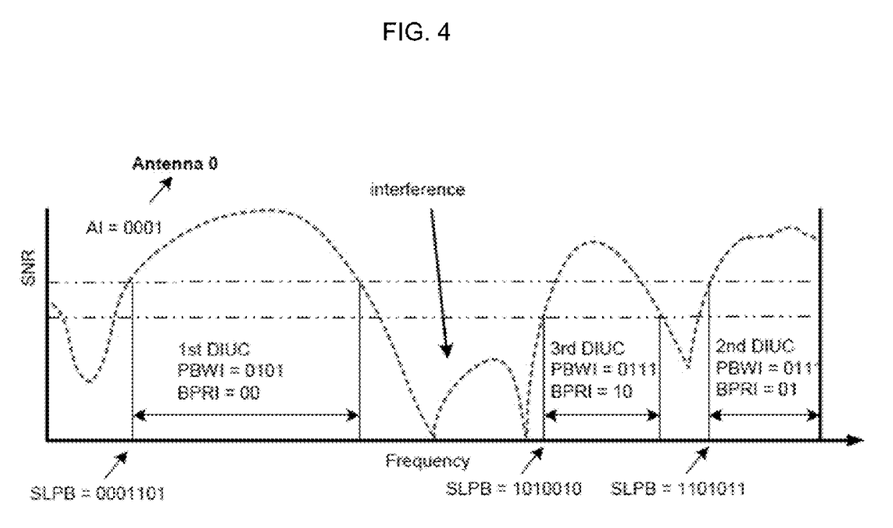
FIG. 4 illustrates an example of setting the parameters in the MIMO feedback header according to the measures signal SNR.

FIG. 4 illustrates an example of setting the parameters in the MIMO feedback header according to the measured signal SNR.

Figure 5:
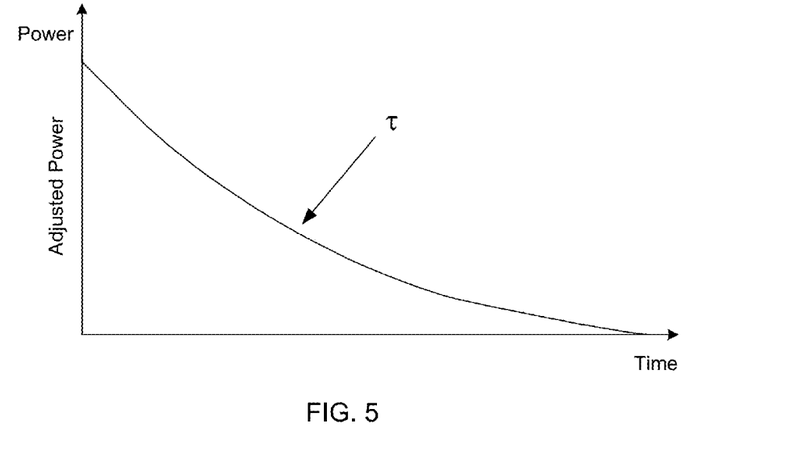
FIG. 5 shows one example of time-decayed transmit power used for a cluster when the cluster's average signal-to-noise ratio is above the threshold to reduce unnecessary transmit power

Power of each antenna of a cluster can be adjusted according to the CQI channel feedback from the receivers. Let us assume that $P_{ij}$ is the set transmit power for antenna j in cluster i, and $\Delta P_{ij}$ is the power value to be added or reduced based on the feedback from the receivers. When the signal fading for the cluster i is below the lower threshold, the transmit power is increased by an increment of $\Delta P_{ij}$ until the SNR at the receiver exceeds the lower threshold. If the SNR of the cluster i at the receiver exceeds the upper threshold, the transmit power is decreased by an increment of $\Delta P_{ij}$ until the SNR at the receiver falls below the upper threshold. This decay is used to minimize the unnecessary excessive transmit power. A decay factor 2 can be introduced to $\Delta P_{ij}$ as $\Delta P_{ij}(t)$ to further reduce the feedback bandwidth requirement as shown in FIG. 5. The τ value is often determined based on the channel correlation time, the value can vary from one receiver to another receiver.

Figure 6:
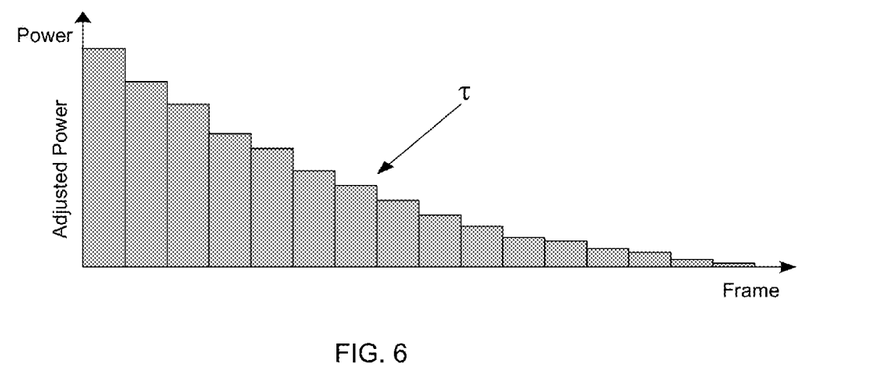
FIG. 6 shows one example of time-decayed power adjustments in each frame over time.

FIG. 6 illustrates an example of the time decay of the incremental change $\Delta P_{ij}(k)$ in the transmit power, where k represents the duration of k OFDM or OFDMA frames. The $\Delta P_{ij}(k)$ decays over a number of frames n. In cluster i, Tx antenna j transmits power of $P_{ij}+\Delta P_{ij}(k)$ after k frames.

The above power control techniques may be applied to OFDM and OFDMA systems. Examples of such applications include: (1) An OFDM or OFDMA system that uses cluster based sub-carrier power control. (2) An OFDM or OFDMA system that uses cluster based sub-carrier power control in a downlink or uplink sub-frame. (3) An OFDM or OFDMA system that uses cluster based sub-carrier power control for single transmit antenna, and single or multiple receive antennas. (4) An OFDM or OFDMA system that uses cluster based sub-carrier power control for multiple transmit antennas, and single or multiple receive antennas. (5) An OFDM or OFDMA system that uses cluster based MIMO pre-coding operations for multiple transmit antennas and multiple receive antennas. (6) An OFDM or OFDMA system that provides cluster based channel quality indication (CQI) feedback to each transmit antenna. Channel quality can be measured in terms of SNR which is below the lower or above the upper thresholds. (7) An OFDM or OFDMA system that provides channel quality indication (CQI) feedback to each transmit antenna to indicate only the clusters with channel quality (e.g. SNR measurement) below the set lower threshold or above the set upper threshold. This simplified CQI feedback method can reduce feedback channel bandwidth. (8) An OFDM or OFDMA MIMO system that provides composite channel quality indication (CQI) feedback to each transmit antenna to indicate only the clusters with composite channel quality (e.g. SNR measurement) below the set lower or above the set higher thresholds. This simplified CQI feedback method can reduce feedback channel bandwidth. (9) An OFDM or OFDMA system that the power of the Tx antenna of a cluster can be adjusted according to the CQI channel feedback (e.g. SNR measurement) from the receivers. (10) An OFDM or OFDMA MIMO system that the power of each Tx antenna of a cluster can be adjusted according to the composite CQI channel feedback (e.g. SNR measurement) from the receivers. (11) An OFDM or OFDMA system that uses cluster based power control with decay factor τ for the adjusted power values. The adjusted power decay over time to reduce feedback bandwidth. (12) An OFDM or OFDMA system that uses cluster based power control with a time decay factor τ for the adjusted power values. The decay factor τ may vary from one receiver to another receiver.

In implementations, the above described techniques and their variations may be implemented as computer software instructions or firmware instructions. Such instructions may be stored in an article with one or more machine-readable storage media or stored in one or more machine-readable storage devices connected to one or more computers or digital processors such as digital signal processors and microprocessors. In operation, the instructions are executed by one or more processors to cause the machine to perform the described functions and operations.

Only a few examples are described. Other enhancements and variations are possible based on what is described and illustrated in this application.

What is claimed is:

1. A method for controlling power in a wireless communication system based on OFDM or OFDMA, comprising:
    monitoring a cluster signal parameter of each of a plurality of clusters of sub-carriers at a receiver, wherein each cluster comprises a set of sub-carriers that are sequential in frequency and the cluster signal parameter indicates signal fading of the cluster as a whole;
    feeding information of the cluster signal parameter of a selected cluster as a whole, without signal fading information of each individual subcarrier in that cluster, back to a transmitter that produces and transmits sub-carriers received by the receiver; and
    controlling the transmitter to:
        increase transmit power of at least one cluster when the cluster signal parameter of the one cluster is below a first threshold; and
        upon increasing the transmit power of the at least one cluster, reduce the transmit power of the at least one cluster using a decay factor when the cluster signal parameter of the one cluster is not below the threshold.

2. The method as in claim 1, further comprising:
    using an averaged signal-to-noise ratio of sub-carriers in each cluster as the cluster signal parameter; and
    comparing the averaged signal-to-noise ratio to a threshold signal-to-noise ratio in controlling the transmitter.

3. The method as in claim 1, wherein the information of the selected cluster includes a cluster identification number and channel quality information.

4. The method as in claim 1, wherein the threshold for the cluster signal parameter is a lower limit for the cluster signal parameter with acceptable performance.

5. The method as in claim 4, further comprising:
    setting an upper threshold as an upper limit for the cluster signal parameter; and
    feeding information of the cluster signal parameter of the selected cluster as a whole back to the transmitter when the cluster signal parameter at the receiver is above the upper threshold; and
    wherein the transmitter is controlled in response to the cluster signal parameter to selectively decrease the transmit power of the selected cluster.

6. The method as in claim 5, further comprising, while reducing transmit power of the cluster whose signal parameter is above the upper threshold, controlling the transmitter to increase the transmit power of at least another cluster whose signal parameter is below the lower threshold.

7. The method as in claim 1, further comprising:
    using a channel quality indication (CQI) measurement to obtain an averaged signal-to-noise ratio of the cluster from measured signal-to-noise ratios of individual sub-carriers within the cluster; and
    using the averaged signal-to-noise ratio of the cluster and a corresponding cluster identification number as part of the cluster signal parameter.

8. The method as in claim 7, wherein at least two transmit antennas are used to transmit each signal to achieve transmit diversity, the method further comprising:
    obtaining CQI measurements on signals respectively from the at least two transmit antennas; and
    producing a composite cluster signal parameter from the CQI measurements to indicate signal fading of each cluster as a whole at the receiver.

9. The method as in claim 8, wherein at least two receiver antennas are used in the receiver to receive signals from the at least two antennas, the method further comprising:
    prior to the CQI measurements, performing a space-time decoding process and then a maximum ratio combining operation at the receiver.

10. The method as in claim 8, further comprising:
    including a multiple input and multiple output (MIMO) weight matrix in the information of the selected cluster fed back to the transmitter.

11. The method as in claim 10, further comprising using a MIMO Channel Feedback header with CID (Connection Identification) field to feedback the MIMO weight matrix.

12. A communication system, comprising:
    a plurality of base stations spatially distributed to wirelessly communicate with subscriber stations via radio links that comprise OFDM or OFDMA sub-carriers;
    a plurality of base station controllers, each coupled to control and communicate with the plurality of base stations;
    a monitoring mechanism to monitor signal fading of each of a plurality of clusters of sub-carriers at a receiver, wherein each cluster comprises a set of sub-carriers that are sequential in frequency and the signal fading indicates signal fading of the cluster as a whole;
    a communication mechanism to feed information of the signal fading of a cluster, without signal fading information of each individual subcarrier in each cluster, to a transmitter that produces and transmits the clusters of sub-carriers; and
    a control mechanism to control the transmitter in response to the signal fading to:
        increase power of at least one cluster of sub-carriers when the signal fading reaches a signal fading threshold; and
        upon increasing the transmit power of the at least one cluster, reduce the transmit power using a decay factor when the cluster signal parameter of the one cluster is not below the signal fading threshold.

13. The system as in claim 12, wherein the receiver is a receiving base station and the transmitter is a transmitting subscriber station.

14. The system as in claim 12, wherein the receiver is a receiving subscriber station and the transmitter is a transmitting base station.

15. The system as in claim 12, wherein the communication mechanism does not send a feedback on signal fading of a cluster to the transmitter when the signal fading of the cluster does not reach the signal fading threshold.

16. A method for controlling power in a wireless communication system based on Orthogonal Frequency Division Multiplexing or Orthogonal Frequency Division Multiplexing Access, comprising:
   independently controlling transmitted power of each of a plurality of clusters of sub-carriers at a transmitter, wherein each cluster comprises a set of sub-carriers that are sequential in frequency;
   receiving information of a cluster signal parameter of a selected cluster as a whole, without receiving signal fading information of each individual subcarrier in the selected cluster; and
   controlling a transmitted signal power of the selected cluster to:
      increase transmit power when the cluster signal parameter of the selected cluster is below a threshold; and
      upon increasing the transmit power of the at least one cluster, reduce the transmit power using a decay factor when the cluster signal parameter of the selected cluster is not below the threshold.

17. The method of claim 16, wherein the decay factors of at least some of the plurality of clusters are different in values.

18. The method of claim 16, wherein the decay factor is responsive to an operating condition of a receiver of a transmission of the selected cluster.

19. The method of claim 16, wherein the transmitter comprises two or more antenna, the method further comprising:
   receiving Channel Quality Indication (CQI) feedback; and
   adjusting transmit power of each of the two or more antenna based on the CQI feedback.

* * * * *